March 6, 1951  W. W. MAHER ET AL  2,543,790
COUNTING DEVICE FOR CAN TESTING MACHINES
Filed Dec. 8, 1947  2 Sheets-Sheet 1
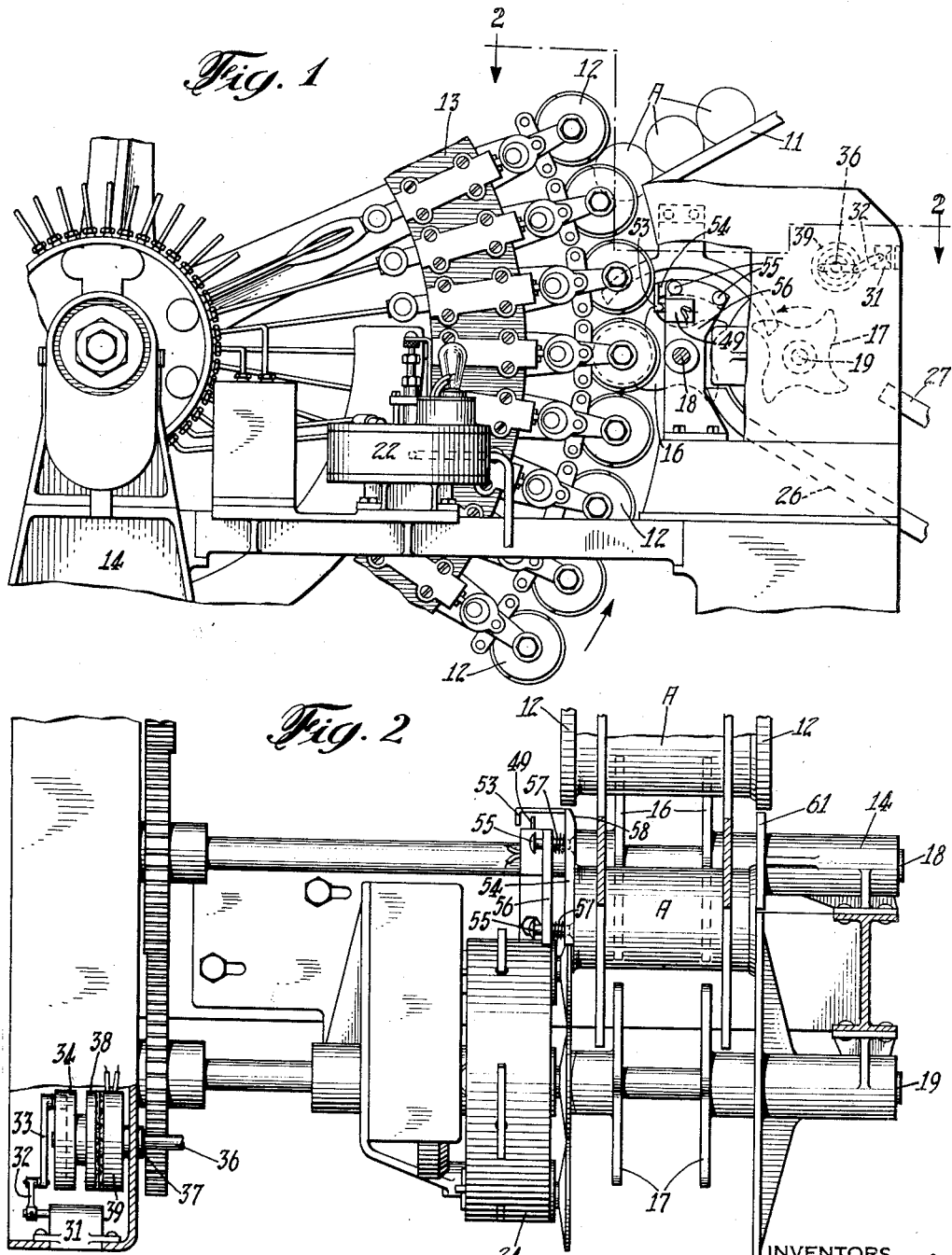

March 6, 1951

W. W. MAHER ET AL 2,543,790

COUNTING DEVICE FOR CAN TESTING MACHINES

Filed Dec. 8, 1947

INVENTORS
William W. Maher
Karl Bofinger
BY
ATTORNEYS

Patented Mar. 6, 1951

2,543,790

UNITED STATES PATENT OFFICE 2,543,790

COUNTING DEVICE FOR CAN TESTING MACHINES

William W. Maher, San Francisco, Calif., and Karl Bofinger, Cincinnati, Ohio, assignors to American Can Company, New York, N. Y., a corporation of New Jersey Application December 8, 1947, Serial No. 790,330

2 Claims. (Cl. 235—98)

1

The present invention relates to container or can testing machines in which cans are subjected to air under pressure to detect those which leak and has particular reference to devices for counting the number of good or nonleaking cans that pass through the machine.

An object of the invention is the provision in a can testing machine of counting devices wherein cans that leak are excluded from the total count of cans passing through the machine so that a count of the cans represents only those cans which are good or nonleaking cans.

Another object is the provision of such counting devices which also excludes from the count of good cans any cans which are absent or missing, for example, cans inadvertently omitted from a substantially continuous procession of cans passing through a normally continuously operating machine. By such an arrangement the counter may be kept in normally continuous operation, except when a can is missing in the procession, or a leaky can is encountered in the procession, thus providing for a longer life of counter parts with a resultant saving in repairs and replacements.

Another object is the provision of such counting devices wherein the counter is actuated through a normally continuously operating electro-magnetic clutch connected with detectors which prevent operation of the clutch when a missing can or a leaking can is detected so that an accurate count of only good, nonleaking cans passing through the machine may be obtained.

Another object is the provision of such counting devices which are simple in construction and accurate in operation and are highly effective in and desirable for modern high speed operating machines.

Numerous other objects and advantages of the invention will be apparent as it is better understood from the following description, which taken in connection with the accompanying drawings, discloses a preferred embodiment thereof.

Referring to the drawings:

Figure 1 is a side elevation of the can discharge portion of a can testing machine embodying the instant invention, with parts broken away;

Fig. 2 is an enlarged top plan view of a portion of the machine taken substantially along the broken line 2—2 in Fig. 1, with parts broken away, the view being rotated through an angle of ninety degrees.

2

Figure 3:
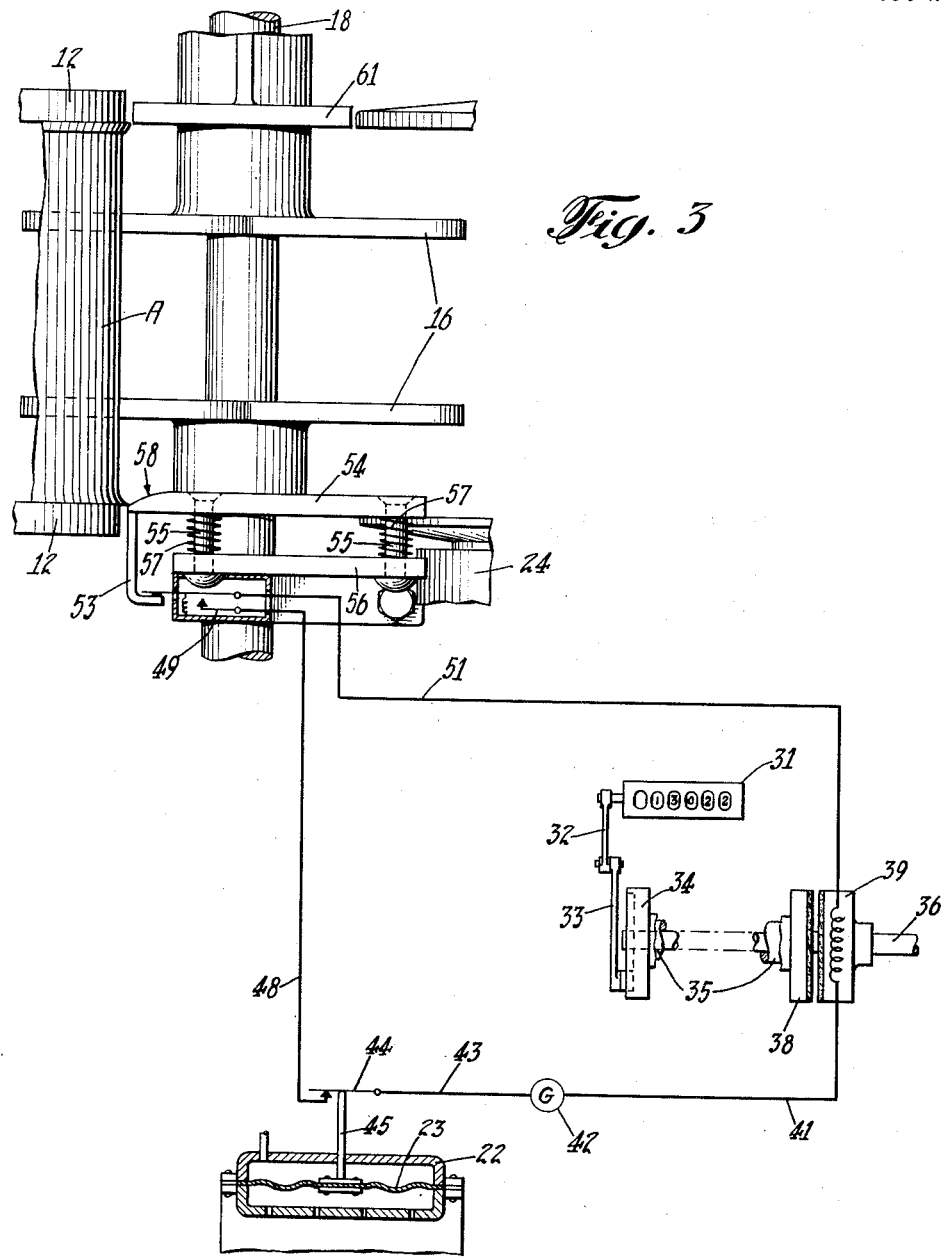
Fig. 3 is a schematic view showing principal parts of the machine, the counting devices, and a wiring diagram of the electric apparatus used in connection with these parts of the machine.

As a preferred embodiment of the invention the drawings illustrate principal parts of a can testing machine of the type disclosed in the United States Patent 2,019,517 issued November 5, 1935 to M. E. Widell on Can Tester. In such a machine, a continuous procession of cans A rolling on their sides, enter the machine to be tested, by way of an inclined chute 11 (Fig. 1). The cans are individually picked up from the chute 11 by a testing head 12 between which a can is clamped for testing. There are a plurality of these testing heads 12 mounted on the outer peripheries of a pair of spaced and parallel wheels 13 which are mounted in a frame 14 constituting the main frame of the machine. The wheels are rotated continuously in any suitable manner.

The tester wheels 13 carry a can A, clamped in a testing head 12, through a circular path of travel during which the can is tested. After testing the can is engaged by an extractor turret 16 (Figs. 1 and 2) having spaced pockets which remove the tested can from its testing head and carry it through a reversed circular path of travel into the grip of a discharge turret 17 having spaced pockets for receiving and discharging the cans.

The extractor turret 16 and its cooperating discharge turret 17 are located just below the can entrance chute 11 and are mounted on respective driving shafts 18, 19 journaled in the machine frame 14. The shafts are rotated continuously in unison and in time with the tester wheels 13, in any suitable manner.

Testing of a can for leaks as it travels with its testing head 12 is effected by introducing air under pressure into the can and sealing off the can by clamping its open end against a clamping head, as explained in the above mentioned Widell patent. A leaky can is detected by a detector valve 22 containing a diaphragm 23 (see Fig. 3) which moves upon disturbance from a predetermined balanced condition by reason of leakage of air from the can. This detector valve 22 controls the operation of a discharge device 24 (Fig. 2) which is disposed adjacent the discharge turret 17 and which acts to release a can into a good can outlet or chute 26 (Fig. 1) or to hold it for release into a leaky or bad can outlet 27, in accordance with the condition of the can as detected by the detector valve. The discharge device 24 forms no part of this invention and therefore a more detailed explanation is thought unnecessary.

As each good, nonleaking can A is received in the extractor turret 16 it is counted. Leaky cans or cans which are missed, such as when no can enters into a testing head 12, are excluded from the count. For this purpose there is provided a good can counting device which includes a commercial counter 31 (Figs. 2 and 3) which is secured to the machine frame 14.

The counter 31 is actuated once for each good can, through a lever 32 and link 33 providing a connection with a disc 34 mounted on a sleeve 35 which surrounds and is freely carried on a shaft 36 journaled in bearings 37 formed in the machine frame. Only one of these bearings is shown in the drawings. The sleeve 35 carries a magnetizable driving disc 38 which is located adjacent an electro-magnetic clutch member 39 carried on the shaft 36. The shaft 36 and its clutch member 39 are rotated continuously, one revolution for each can testing head 12, in any suitable manner in time with the other moving parts of the machine.

Referring now in particular to Fig. 3 it will be seen that the electro-magnetic clutch member 39 is connected in any suitable manner as through a stationary brush or the like, with a lead wire 41 which connects with one side of a suitable source of electric current such as a generator 42. The opposite side of the generator is connected by a wire 43 to an electric switch 44 which at times is actuated and moved into an open position by a post 45 connected with and movable by the diaphragm 23 in the can detector valve 22.

The switch 44 is also connected by a wire 48 to an electric switch 49, which in turn is connected by a wire 51 to a suitable stationary brush or the like connecting with the electro-magnetic clutch member 39. The switch 49, at times is actuated by a hook shaped member 53 which is formed on a yieldably mounted pusher shoe or plate 54 constituting an auxiliary detector disposed adjacent the extractor turret 16. The plate is carried on a pair of spaced and parallel pins 55 which slide in a support bracket 56 secured to the machine frame. A pair of compression springs 57 surrounding the pins and interposed between the pusher plate and the bracket urge the plate into the path of travel of the cans adjacent one end thereof. The leading end of the plate is formed with a tapered nose 58 to facilitate engagement of the plate by the cans.

Hence as the tested cans A, whether good or bad, are propelled by the extractor turret 16 toward the discharge turret 17, they come into engagement with the tapered nose 58 of the pusher plate 54 and thus ride up onto the plate, meanwhile wedging themselves between the plate and an oppositely disposed stationary guide rail 61 secured to the machine frame 14. The plate thus insures proper endwise location of the can in the turret by pushing it against the guide rail. This locating action, however, pushes the plate outwardly as shown in Fig. 2 and thus disengages the hook shaped member 53 from the switch 49 and hence permits the switch to close.

Under normal operation of the tester, as when cans are passing through the machine in a continuous procession, the pusher plate 54 remains in a depressed or outwardly pressed position as shown in Fig. 2, the plate being long enough to allow a following can to engage the plate and hold it depressed before a leading can rides off of it to effect its release. Hence as long as the plate is held depressed by the passing cans and no leaky cans are detected, the two switches 44, 49 remain closed. With these two switches closed the electric circuit connecting with the electromagnetic clutch member 39 remains closed and hence electric current from the generator flows through the clutch and energizes it. When the clutch is energized, it attracts the disc 38 on the counter sleeve 35 and thus rotates this disc and the disc 34. Rotation of the latter actuates the counter 31. Thus the counter remains in continuous operation and counts all good cans unless otherwise stopped.

When a leaky can is detected by the detector valve 22 the diaphragm 23 in the valve moves and, through the post 45, opens the switch 44 for just this one can. The electric circuit is thereupon broken for a period of time equal to one rotation of the electro-magnetic clutch. Hence the clutch is de-energized for one rotation and this stops the counter disc 38 for one rotation and thus prevents the counter from recording this leaky can. The drag of the counter mechanism acts as a brake on the counter disc 38 to stop it instantly.

If only one leaky can is detected, counting is resumed immediately upon the closing of the switch 44 after this can has passed. However if immediately following cans are found leaky, the diaphragm will keep the switch 44 open for as long as leaky cans follow each other in succession and thus prevent the recording of cans until the next good can comes along.

In a similar manner, if a can has been missed or skipped so that there is a break in the continuous passage of cans through the machine, this missed can or cans if more than one, will break the electric circuit and thereby deenergize the electro-magnetic clutch member 39 and thus stop the counter disc 38 and the operation of the counter. This is brought about by the pusher plate 54.

When there is no can in place to keep the pusher plate 54 depressed as shown in Fig. 2, its springs 57 force it inwardly into the space where the can should be as shown in Fig. 3 and this causes the hooked shaped member 53 to open the switch 49. The opening of this switch immediately breaks the electric circuit and thus de-energizes the electro-magnetic clutch 39 for this one can. If only one can is missed, the next following can immediately depresses the pusher plate 54 and the switch 49 is again closed and counting is resumed if such following can is a good or nonleaky can. If more than one can is missed in succession, the pusher plate remains in its released position, and the electric circuit remains broken until a can again depresses the plate.

Hence with such a construction of counting mechanism, counting of the cans as they leave the machine is normally continuous, since by far the largest number of cans are good cans. This continuous operation of the counter provides for long life of the counter parts and prevents frequent break downs with their resultant necessary repairs and replacements. With such a device only the good cans are counted, all others which may be leaky cans or may be missing cans are excluded from the count, thereby rendering a fully accurate and dependable count of only good cans.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A counting device for determining the number of good containers discharged from a testing machine having a diaphragm balanced by air pressures on opposite sides for detecting leakage of air pressure from a container under test, comprising a counter for registering good containers tested and discharged from the machine, a continuously rotating shaft having means including a magnetic clutch disc loosely mounted on the shaft for driving said counter, a magnetic clutch member fixed on said shaft in operative relation to said clutch disc, and an electric circuit connecting with said clutch member, said circuit having a switch connected to and operated by the diaphragm of the testing machine, said switch being held closed by said diaphragm during testing of good containers, a decrease of air pressure on one side of said diaphragm caused by a leaky container under test resulting in movement of the diaphragm to open said switch and momentarily break the circuit through said clutch to disconnect said counter from said shaft to interrupt the counting operation.

2. A counting device for determining the number of good containers discharged from a testing machine having a diaphragm balanced by air pressures on opposite sides for detecting leakage of air pressure from a container under test, comprising a counter for registering good containers tested and discharged from the machine, a continuously rotating shaft having means including a magnetic clutch disc loosely mounted on the shaft for driving said counter, a magnetic clutch member fixed on said shaft in operative relation to said clutch disc, an auxiliary detector shoe engageable by containers discharged from the machine, an electric circuit connected to said clutch member and operating said counter as long as said circuit is closed, a diaphragm switch included in said circuit and connected to the diaphragm of the testing machine, and an auxiliary switch in said circuit and connected to said detector shoe, said diaphragm switch being held closed by the diaphragm during testing of good containers and said auxiliary switch being held closed by both good and leaky containers engaging said detector shoe, a decrease of air pressure on one side of said diaphragm caused by a leaky container under test resulting in movement of the diaphragm to open said diaphragm switch and failure of containers to engage said detector shoe opening said auxiliary switch, opening of either switch momentarily breaking the circuit through said clutch and disconnecting said counter from said shaft to insure that only good containers discharged from the testing machine are counted.

WILLIAM W. MAHER.
KARL BOFINGER.

REFERENCES CITED

The following references are of record in the file of this patent:

UNITED STATES PATENTS

| Number | Name | Date |
|---|---|---|
| 2,019,517 | Widell | Nov. 5, 1935 |
| 2,124,500 | Taylor | July 19, 1938 |
| 2,208,270 | Grout | July 16, 1940 |

FOREIGN PATENTS

| Number | Country | Date |
|---|---|---|
| 112,920 | Great Britain | Jan. 23, 1918 |
| 284,822 | Great Britain | Feb. 9, 1928 |